United States Patent
Taniguchi et al.

(10) Patent No.: US 8,980,490 B2
(45) Date of Patent: Mar. 17, 2015

(54) FUEL CELL SYSTEM

(71) Applicant: Nissan Motor Co., Ltd., Yokohama-shi, Kanagawa-ken (JP)

(72) Inventors: Ikuhiro Taniguchi, Zushi (JP); Hiromasa Sakai, Yokosuka (JP); Kotaro Akashi, Yokohama (JP); Nobutaka Takahashi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 14/449,369

(22) Filed: Aug. 1, 2014

(65) Prior Publication Data

US 2014/0342259 A1    Nov. 20, 2014

Related U.S. Application Data

(62) Division of application No. 11/721,114, filed as application No. PCT/JP2005/021940 on Nov. 22, 2005, now Pat. No. 8,822,092.

(30) Foreign Application Priority Data

Dec. 7, 2004  (JP) ................................. 2004-354304

(51) Int. Cl.
*H01M 8/04* (2006.01)
(52) U.S. Cl.
CPC ...... *H01M 8/04067* (2013.01); *H01M 8/04007* (2013.01); *H01M 8/04223* (2013.01); *H01M 8/04328* (2013.01); *H01M 8/04358* (2013.01); *H01M 8/04373* (2013.01);

(Continued)

(58) Field of Classification Search
CPC ..................... H01M 8/04067; H01M 8/04074; H01M 8/04253; H01M 8/04223
USPC ................... 429/428, 429, 437, 441
See application file for complete search history.

(56) References Cited

U.S. PATENT DOCUMENTS

| 5,605,770 A | 2/1997 | Andreoli et al. |
| 6,899,969 B2 | 5/2005 | Kanno |

(Continued)

FOREIGN PATENT DOCUMENTS

| EP | 0 741 428 A1 | 11/1996 |
| JP | 8-315840 A | 11/1996 |

(Continued)

*Primary Examiner* — Helen O Conley
(74) *Attorney, Agent, or Firm* — Foley & Lardner LLP

(57) ABSTRACT

A fuel cell system of the present invention includes: a fuel cell supplied with fuel gas and oxidizing gas to generate electricity; a fuel gas supply unit supplying the fuel gas to the fuel cell; an oxidizing gas supply unit supplying the oxidizing gas to the fuel cell; an aftercooler cooling the oxidizing gas supplied to the fuel cell by heat exchange with a coolant; an oxidizing gas temperature detector detecting temperature of the oxidizing gas; and a coolant circulation controller starting circulation of the coolant when the detected temperature of the oxidizing gas exceeds a predetermined value. The predetermined value is set to a value of not higher than a minimum electricity generation temperature of the fuel cell, and a circulation timing and flow rate of the coolant for the aftercooler are controlled such that the supplied oxidizing gas does not become cold. This enables the fuel cell to generate electricity at cold start-up.

13 Claims, 13 Drawing Sheets

(52) U.S. Cl.
CPC ..... *H01M 8/04701* (2013.01); *H01M 8/04708* (2013.01); *H01M 8/04723* (2013.01); *H01M 8/04731* (2013.01); *H01M 8/04738* (2013.01); *H01M 8/04768* (2013.01); *H01M 8/04074* (2013.01); *H01M 8/04365* (2013.01); *Y02E 60/50* (2013.01)
USPC ............ 429/429; 429/428; 429/437; 429/441

(56) References Cited

U.S. PATENT DOCUMENTS

| | | |
|---|---|---|
| 2001/0053469 A1 | 12/2001 | Kobayashi et al. |
| 2002/0146606 A1 | 10/2002 | Kobayashi et al. |
| 2003/0087139 A1 | 5/2003 | White |
| 2003/0162066 A1 | 8/2003 | Shiraishi et al. |
| 2004/0018402 A1 | 1/2004 | Takahashi |
| 2006/0222918 A1 | 10/2006 | Koike |

FOREIGN PATENT DOCUMENTS

| | | |
|---|---|---|
| JP | 2002-246053 A | 8/2002 |
| JP | 2003-036874 A | 2/2003 |
| JP | 2003-208914 A | 7/2003 |
| JP | 2004-311055 A | 11/2004 |
| JP | 2004-311262 A | 11/2004 |
| WO | WO-2004/086545 A2 | 10/2004 |
| WO | WO 2004/093230 A1 | 10/2004 |

# FUEL CELL SYSTEM

CROSS REFERENCE TO RELATED APPLICATIONS

This application is a divisional of U.S. application Ser. No. 11/721,114, filed Jun. 7, 2007, which is the National Stage of Application No. PCT/JP2005/021940, filed Nov. 22, 2005, which is based upon and claims benefit of priority from the prior Japanese Application No. 2004-354304, filed Dec. 7, 2004; the entire contents of all of which are incorporated herein by reference.

TECHNICAL FIELD

The present invention relates to a fuel cell system including a fuel cell supplied with fuel gas such as hydrogen and oxidizing gas such as air to generate electricity, in which cold start control of the fuel cell is improved.

BACKGROUND ART

A conventional technology of a cold start control method of a fuel cell in a fuel cell system is disclosed in the Japanese Patent Laid-open Publication No. 2003-208914. In this fuel cell system, air is pressurized by a compressor at cold start-up to increase in temperature. Temperature of air supplied to the fuel cell is therefore increased to promote electricity generation.

DISCLOSURE OF INVENTION

However, in the control method disclosed in the aforementioned document, when a coolant circulating through an air aftercooler is cold at cold start-up, heat exchange is performed between compressed air and the cold coolant in the air aftercooler, and the temperature of air supplied to the fuel cell is unnecessarily lowered. Water of an electrolyte membrane is therefore frozen due to the cooled compressed air, thus causing a problem of making it difficult to generate electricity.

The present invention was made to solve such a conventional problem, and an object of the present invention is to provide a fuel cell system which enables the fuel cell to generate electricity at cold start-up by controlling circulation timing and flow rate of the coolant of the aftercooler such that the supplied air does not become cold.

The first aspect of the present invention provides a fuel cell system comprising: a fuel cell supplied with fuel gas and oxidizing gas to generate electricity; a fuel gas supply unit supplying the fuel gas to the fuel cell; an oxidizing gas supply unit supplying the oxidizing gas to the fuel cell; an aftercooler cooling the oxidizing gas supplied to the fuel cell by heat exchange with a coolant; an oxidizing gas temperature detector detecting temperature of the oxidizing gas; and a coolant circulation controller starting circulation of the coolant when the detected temperature of the oxidizing gas exceeds a predetermined value.

The second aspect of the present invention provides a fuel cell system comprising: a fuel cell supplied with fuel gas and oxidizing gas to generate electricity; a fuel gas supply unit supplying the fuel gas to the fuel cell; an oxidizing gas supply unit supplying the oxidizing gas to the fuel cell; an aftercooler cooling the oxidizing gas supplied to the fuel cell by heat exchange with a coolant; a coolant temperature detector detecting temperature of the coolant; and a coolant circulation controller stopping circulation of the coolant when the temperature of the coolant at start-up is not higher than a predetermined temperature, the predetermined temperature being a temperature not lower than a minimum temperature of the oxidizing gas at which the fuel cell can generate electricity.

The third aspect of the present invention provides a fuel cell system comprising: a fuel cell supplied with fuel gas and oxidizing gas to generate electricity; fuel gas supply means for supplying the fuel gas to the fuel cell; oxidizing gas supply means for supplying the oxidizing gas to the fuel cell; an aftercooler cooling the oxidizing gas supplied to the fuel cell by heat exchange with a coolant; oxidizing gas temperature detection means for detecting temperature of the oxidizing gas; and coolant circulation control means for starting circulation of the coolant when the detected temperature of the oxidizing gas exceeds a predetermined value.

The fourth aspect of the present invention provides a fuel cell system comprising: a fuel cell supplied with fuel gas and oxidizing gas to generate electricity; fuel gas supply means for supplying the fuel gas to the fuel cell; oxidizing gas supply means for supplying the oxidizing gas to the fuel cell; an aftercooler cooling the oxidizing gas supplied to the fuel cell by heat exchange with a coolant; coolant temperature detection means for detecting temperature of the coolant; and coolant circulation control means for stopping circulation of the coolant when the temperature of the coolant at start-up is not higher than a predetermined temperature, the predetermined temperature being a temperature not lower than a minimum temperature of the oxidizing gas at which the fuel cell can generate electricity.

The fifth aspect of the present invention provides a method of controlling a fuel cell system comprising: preparing a fuel cell which is supplied with fuel gas and oxidizing gas to generate electricity, a fuel gas supply unit which supplies the fuel gas to the fuel cell, an oxidizing gas supply unit which supplies the oxidizing gas to the fuel cell, and an aftercooler which cools the oxidizing gas supplied to the fuel cell by heat exchange with a coolant; detecting temperature of the oxidizing gas; and starting circulation of the coolant when the detected temperature of the oxidizing gas exceeds a predetermined value.

The sixth aspect of the present invention provides a method of controlling a fuel cell system comprising: preparing a fuel cell which is supplied with fuel gas and oxidizing gas to generate electricity, a fuel gas supply unit which supplies the fuel gas to the fuel cell, an oxidizing gas supply unit which supplies the oxidizing gas to the fuel cell, and an aftercooler which cools the oxidizing gas supplied to the fuel cell by heat exchange with a coolant; detecting temperature of the coolant; and stopping circulation of the coolant when the temperature of the coolant at start-up is not higher than a predetermined temperature, the predetermined temperature being a temperature not lower than a minimum temperature of the oxidizing gas at which the fuel cell can generate electricity.

BEST MODE FOR CARRYING OUT THE INVENTION

Hereinafter, description will be made of embodiments of the present invention with reference to the drawings.

First Embodiment

Figure 1:
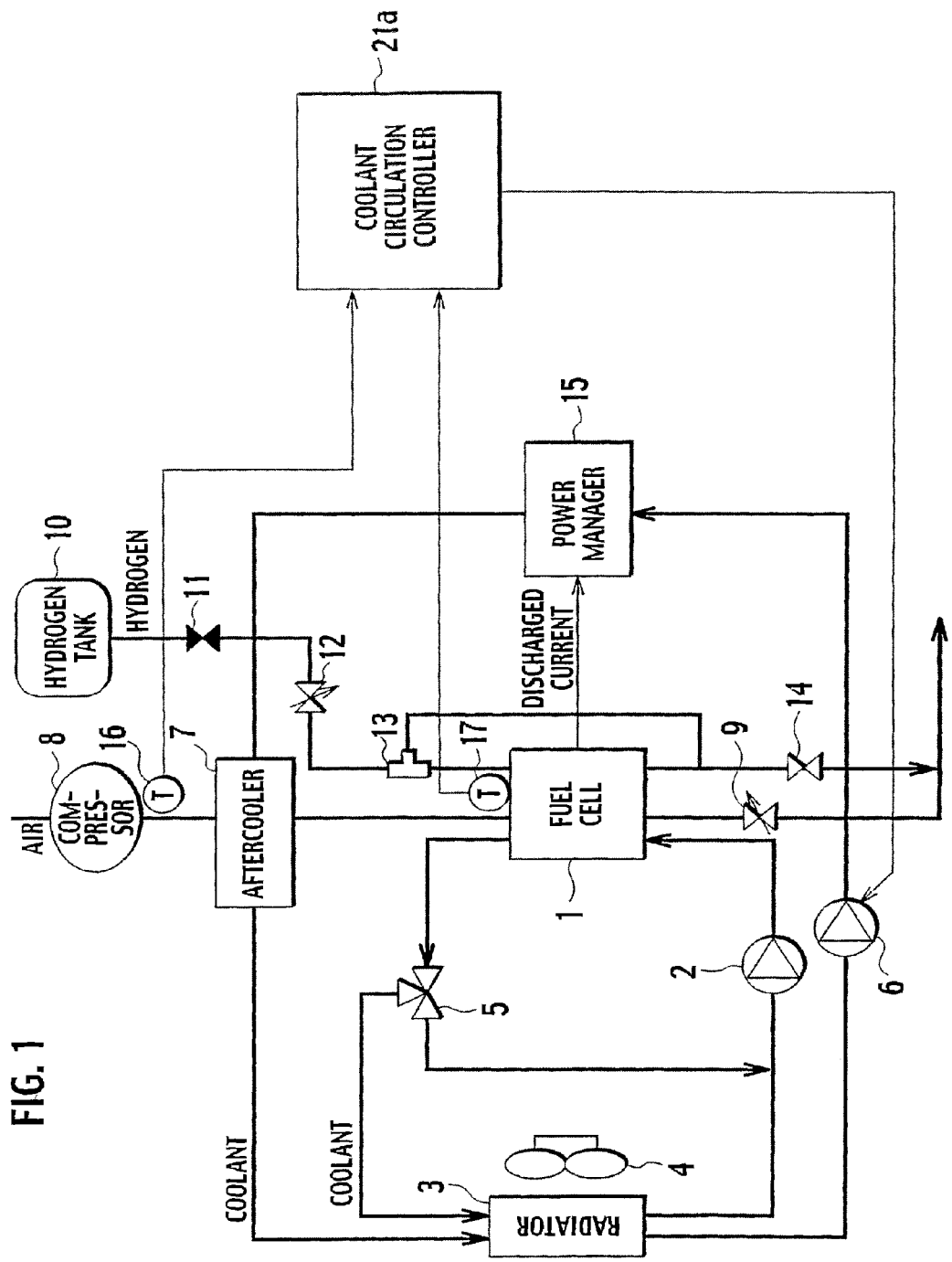
FIG. 1 is a block diagram of a fuel cell system according to a first embodiment of the present invention.

FIG. 1 shows a configuration of a fuel cell system according to a first embodiment of the present invention. The fuel cell system of the embodiment includes a fuel cell 1 and a power manager (PM) 15. The fuel cell 1 is supplied with hydrogen and air to generate electricity. The power manager 15 takes out and manages electric power generated by the fuel cell 1. The fuel cell system includes, as a hydrogen supply system, a hydrogen tank 10, a pressure reducing valve 11, a hydrogen pressure control valve 12, an ejector 13, and a purge valve 14 and includes, as an air supply system, a compressor 8, an aftercooler 7, and an air pressure control valve 9. As a cooling system for the fuel cell 1, the fuel cell system includes a pump 2, a radiator 3, a radiator fan 4, and a three way valve 5, and as a cooling system for the power manager 15, includes the radiator 3, the radiator fan 4, a pump 6, and the aftercooler 7. Furthermore, the fuel cell system includes, as a coolant circulation control system, a compressor outlet temperature sensor 16 and a fuel cell inlet temperature sensor 17 each corresponding to an oxidizing gas temperature detector and a coolant circulation controller 21a.

The fuel cell stack 1 has a stack structure with a plurality of electricity generation cells stacked in layers. Each electricity generation cell includes a fuel electrode supplied with hydrogen as fuel gas and an oxidant electrode supplied with air as oxidizing gas, the fuel and oxidizing gas electrodes being superposed on each other with an electrolyte interposed therebetween. The fuel cell stack 1 converts a chemical energy into an electric energy through an electrochemical reaction based on hydrogen and oxygen in air. Specifically, hydrogen gas is supplied to an anode, and air is supplied to a cathode. The following electrode reaction then proceeds, and electric power is generated.

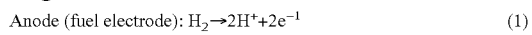

Anode (fuel electrode): $H_2 \rightarrow 2H^+ + 2e^{-1}$ (1)

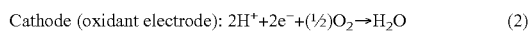

Cathode (oxidant electrode): $2H^+ + 2e^- + (\frac{1}{2})O_2 \rightarrow H_2O$ (2)

Hydrogen is supplied to the anode from the hydrogen tank 10 through the pressure reducing valve 11 and hydrogen pressure control valve 12. Pressure of high pressure hydrogen supplied from the hydrogen tank is mechanically reduced to a predetermined pressure by the pressure reducing valve 11, and hydrogen pressure in the fuel cell 1 is controlled to a desired hydrogen pressure by the hydrogen pressure control valve 12. The ejector 13 is provided to recirculate hydrogen which remains unconsumed in the anode. Hydrogen pressure in the anode is controlled by driving the hydrogen pressure control valve 12. By making a control to keep the hydrogen pressure constant, hydrogen is automatically supplied as much as is consumed by the fuel cell 1. Reference numeral 14 denotes a purge valve, which discharges nitrogen transmitted from the cathode to the anode and accumulated in the hydrogen supply system. The discharged nitrogen and hydrogen gas mixture is diluted by exhaust air from the cathode. The air to the cathode is supplied from the compressor 8. The air supplied from the compressor 8 increases in temperature due to the increase in pressure. Accordingly, the air is supplied to the cathode after being cooled by heat exchange with the coolant in the aftercooler 7. Air pressure in the cathode is controlled by driving the air pressure control valve 9.

In the fuel cell system of the embodiment, there are two coolant flow paths, which are paths of the cooling system for the fuel cell 1 and the cooling system for the power manager 15. In the cooling system for the fuel cell 1, the coolant is circulated through the fuel cell 1, the radiator 3, a radiator bypass by the pump 2. The three way valve 5 divides the coolant to a radiator 3 side and a radiator bypass side in order to regulate temperature of the coolant. When the coolant cannot be cooled to a desired temperature by only operating the three way valve 5 to the radiator 3 side, the radiator fan 4 is also driven.

In the cooling system for the power manager 15, the coolant is circulated through the power manager 15, aftercooler 7, and radiator 3 by the pump 6. In addition, high power components such as a vehicle drive motor may be disposed in the cooling system for the power manager 15. The power manager 15 takes out electric current and power from the fuel cell 1.

The coolant circulation controller 21a determines, according to the air temperatures detected by the compressor outlet temperature sensor 16 and the fuel cell inlet temperature sensor 17, start of the circulation of the coolant for the power manager 15 at start-up of the fuel cell 1 and then drives the pump 6.

Figure 2:
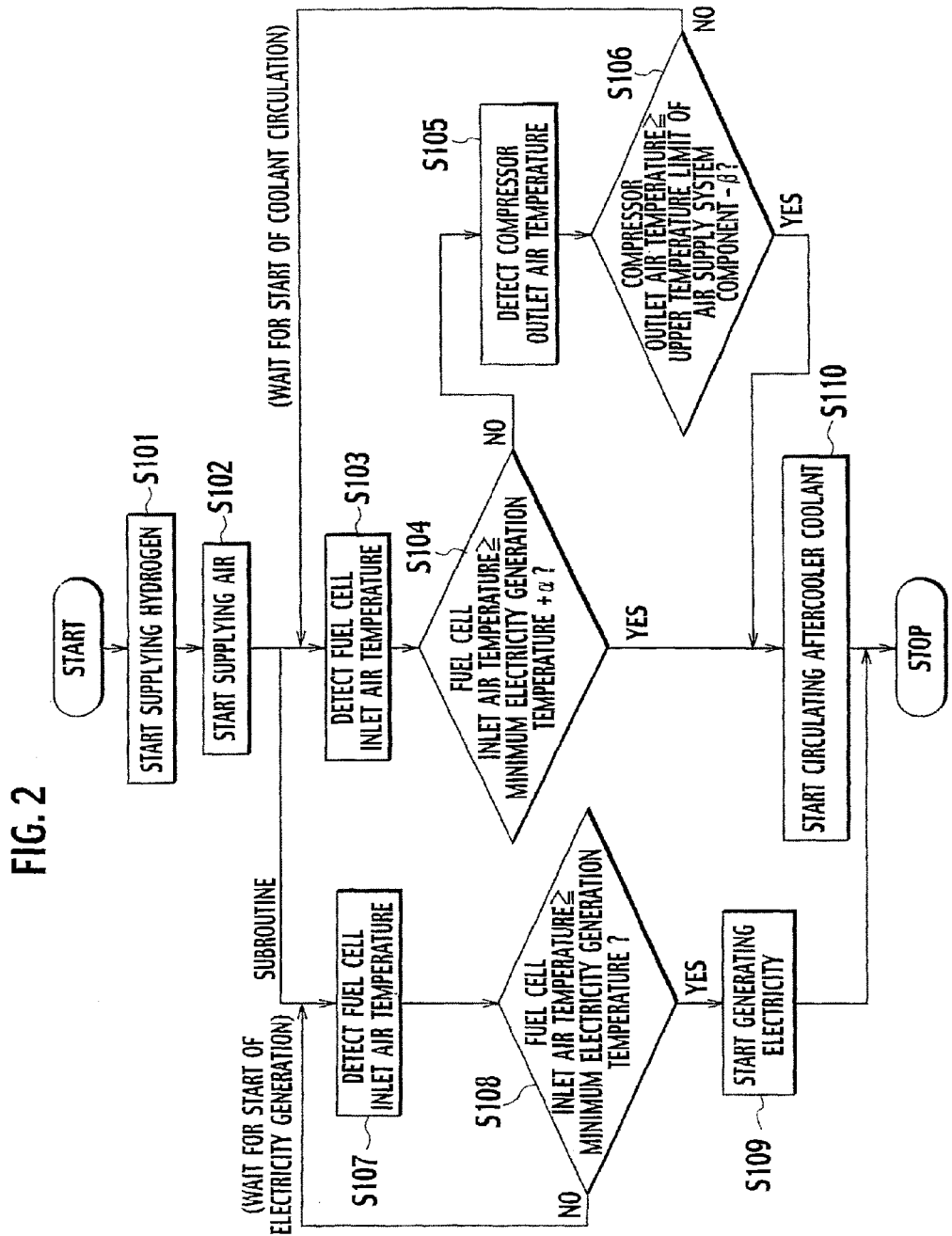
FIG. 2 is a flowchart explaining a processing flow of cold start control of a fuel cell according to the first embodiment.
Figure 3:
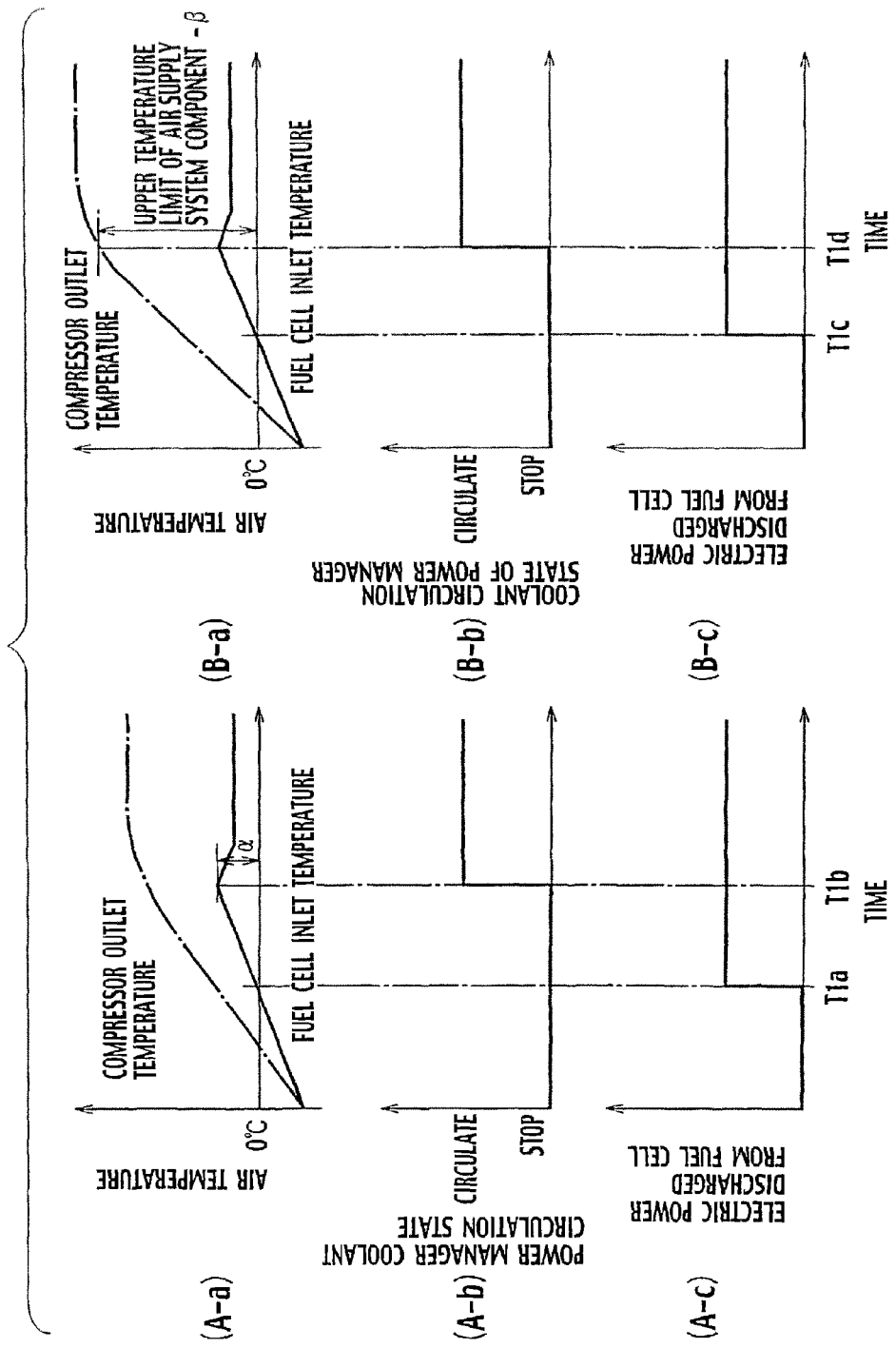
FIG. 3 is a time chart explaining an operation in the cold start control of a fuel cell according to the first embodiment.

Next, a description is given of cold start control of the fuel cell 1 in the fuel cell system of this embodiment with reference to FIGS. 2 and 3. FIG. 2 shows a flowchart explaining a processing flow of the cold start control of the fuel cell 1 in this embodiment, and FIG. 3 shows a time chart explaining an operation in the cold start control of the fuel cell in this embodiment. In FIG. 3, (A-a) and (B-a) represent a change of air temperature with time (compressor outlet temperature and fuel cell inlet temperature); (A-b) and (B-b) represent a change with time of a state of coolant circulation for the power manager 15; and (A-c) and (B-c) represent a change with time of electric power discharged from the fuel cell 1.

Hereinafter, a description is given along the flowchart of FIG. 2. First, supply of hydrogen from the hydrogen tank 10 to the anode of the fuel cell 1 is started (step S101). The compressor 8 is then driven to start supplying air to the cathode of the fuel cell 1 (step S102).

Next, a process from step S103 to step S110 and a process from step S107 to step S109 are simultaneously carried out in parallel.

In the process from the step S107 to step S109, first, inlet air temperature of the fuel cell 1 is detected by the fuel cell inlet temperature sensor 17 (step S107). Next, it is judged whether the detected air temperature is not lower than a minimum temperature at which the fuel cell 1 can generate electricity (minimum electricity generation temperature) (step S 108). When it is judged in the step S108 that the air temperature has not reached the minimum electricity generation temperature of the fuel cell 1, the process returns to the step S107, and a loop of waiting for start of electricity generation in the steps S107 and S108 is continued. On the other hand, when it is judged that the air temperature has reached the minimum electricity generation temperature of the fuel cell 1, the process proceeds to the step S109, and electricity generation of the fuel cell 1 is started. Herein, the minimum electricity generation temperature of the fuel cell 1 is generally a temperature not lower than the freezing point. This is because, below the freezing point, water of the electrolyte membrane is frozen to close the gas supply path, thus making it difficult to generate electricity.

In the process of the steps S103 to S110, first, the inlet air temperature of the fuel cell 1 is detected by the fuel cell inlet temperature sensor 17 (step S103). Next, it is judged whether the detected air temperature is α or more higher than the minimum electricity generation temperature of the fuel cell 1 (step S104). When it is judged in the step S104 that the air temperature is α or more higher, the process proceeds to the step S110, and the circulation of the aftercooler coolant is started.

On the other hand, when it is judged that the air temperature has not reached a temperature which is α or more higher than the minimum electricity generation temperature of the fuel cell 1, the process proceeds to the step S105, and outlet air temperature of the compressor 8 is detected by the compressor outlet temperature sensor 16. Next, it is judged whether the detected outlet air temperature of the compressor 8 is not lower than a temperature value which is β lower than an upper temperature limit of the components in the air supply system (step S106). When it is judged in the step S106 that the outlet air temperature of the compressor 8 is not lower than the temperature value which is β lower than the upper temperature limit of the components in the air supply system, the process proceeds to the step S110, and the circulation of the aftercooler coolant is started. When it is judged that the outlet air temperature of the compressor 8 is lower than the temperature value which is β lower than the upper temperature limit, the process returns to the step S103, and a loop of waiting for circulation of the coolant by the process of the steps S103 to S106 is continued. α and β are temperature margins. Herein, the upper temperature limit of the components in the air supply system is, for example, 180°°C.

Next, (A-a), (A-b), and (A-c) of FIG. 3 show a time chart when the coolant for the power manager 15 is circulated on the basis of the inlet air temperature of the fuel cell 1. When the compressor 8 is driven to start supplying air to the cathode of the fuel cell 1, the air temperature is increased by pressurization. Herein, the outlet air of the compressor 8 is cooled through the aftercooler 7 and then reaches the inlet of the fuel cell 1. This is because the aftercooler 7 itself is a heating medium having heat capacity and is cold at cold start-up even if the coolant is not flowing through the aftercooler 7.

At a time (T1a) when the inlet air temperature of the fuel cell 1 reaches the freezing point, the fuel cell 1 starts generating electricity, and the electric power is discharged from the fuel cell 1 by the power manager 15. At a time (T1b) when the inlet air temperature of the fuel cell 1 reaches a temperature of "the minimum electricity generation temperature (temperature of the freezing point)+α", the circulation of the coolant for the power manager 15 is started. Herein, the flow rate of the coolant and a are set to such a flow rate and a temperature value that the temperature of the air supplied to the fuel cell 1 can be maintained at a temperature not lower than the minimum electricity generation temperature even if the coolant is circulated.

(B-a), (B-b), and (B-c) of FIG. 3 show a time chart when the coolant for the power manager 15 is circulated on the basis of the outlet air temperature of the compressor 8. When the outlet air temperature of the compressor 8 increases to the temperature which is β lower than the upper temperature limit of the components in the air supply system (time T1d), the coolant for the power manager 15 starts being circulated. Herein, β is set as a margin in consideration of air cooling performance of the aftercooler.

As described above, the fuel cell system of this embodiment includes the fuel cell 1 supplied with hydrogen and air to generate electricity; the fuel gas supply unit supplying hydrogen to the fuel cell 1; the oxidizing gas supply unit supplying air to the fuel cell 1; the aftercooler 7 cooling the air supplied to the fuel cell 1 by heat exchange with the coolant; the oxidizing gas temperature detectors 16 and 17 detecting temperature of the air supplied to the fuel cell 1; and the coolant circulation controller 21a which starts circulation of the coolant when the detected air temperature is higher than a predetermined value. The fuel cell system is configured to start the circulation of the coolant when the temperature of the air supplied to the fuel cell 1 exceeds the predetermined value. The flow rate of the coolant of the aftercooler 7 is controlled such that the supplied air does not become cold, in particular, by detecting the inlet air temperature of the fuel cell 1 by means of the oxidizing gas temperature detector (fuel cell inlet temperature sensor) 17 and setting the predetermined value to determine the start of the circulation of the coolant to a value not lower than the minimum electricity generation temperature of the fuel cell 1. This can prevent the occurrence of the conventional problem that the temperature of the air supplied to the fuel cell 1 is lowered and the water of the electrolyte membrane is frozen to make it difficult to generate electricity. The fuel cell can therefore generate electricity at cold start-up.

Moreover, in the fuel cell system of this embodiment, the circulation of the coolant is started by the coolant circulation controller 21a when the air temperature detected by the oxidizing gas temperature detector exceeds the predetermined temperature which is not higher than the upper temperature limit of the components disposed on the air flow path. This can prevent the air temperature from excessively increasing and protect the components disposed on the air flow path and the fuel cell 1.

In this embodiment, a control is made, in particular, such that the outlet air temperature of the air supply unit is detected by the oxidizing gas temperature detector (compressor outlet temperature sensor) 16 and the circulation of the coolant is started by the coolant circulation controller 21a when the detected air temperature exceeds a value which is not higher than the upper temperature limit of the components disposed on the air flow path. This can prevent the air temperature downstream of the air supply unit from excessively increasing and can protect the components downstream of the air supply unit.

Furthermore, the fuel cell system of this embodiment can be modified such that the inlet air temperature of the fuel cell 1 is detected by the oxidizing gas temperature detector (fuel cell inlet temperature sensor) 17 and the circulation of the coolant is started by the coolant circulation controller 21a when the detected air temperature exceeds a predetermined value which is not higher than the upper temperature limit of the fuel cell 1. This can prevent the air temperature downstream of the air supply unit from excessively increasing and protect the components downstream of the air supply unit. Herein, the upper temperature limit of the components in the air supply system is, for example, 90° C.

Second Embodiment

Figure 4:
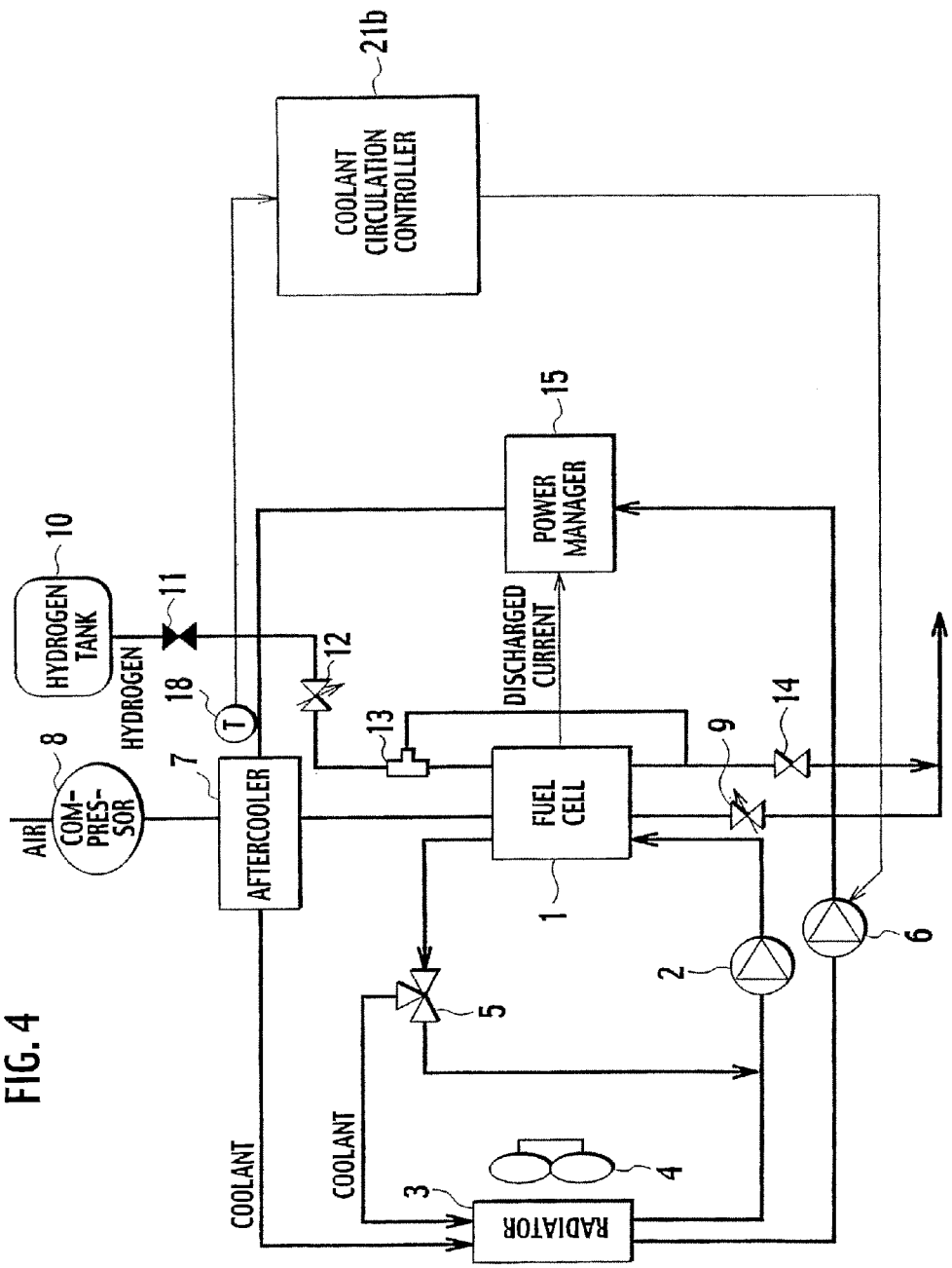
FIG. 4 is a block diagram of a fuel cell system according to a second embodiment.

Next, a description is given of a fuel cell system according to a second embodiment. FIG. 4 shows a configuration of the fuel cell system according to the second embodiment. The fuel cell system of this embodiment, similar to the first embodiment, includes the fuel cell 1 and the power manager 15. Moreover, the hydrogen supply system, the air supply system, and the cooling systems for the fuel cell 1 and the power manager 15 have configurations equivalent to those of the first embodiment. The description of these components is therefore omitted. The configuration of this embodiment differs from that of the first embodiment in that an aftercooler inlet temperature sensor 18 corresponding to a coolant temperature detector and a coolant circulation controller 21b are provided as the coolant circulation control system.

The aftercooler inlet temperature sensor 18 detects temperature of the coolant at the inlet of the aftercooler 7. The coolant circulation controller 21b determines start of the circulation of the coolant for the power manager 15 at start of the fuel cell 1 according to the inlet coolant temperature of the aftercooler 7 detected by the aftercooler inlet temperature sensor 18.

Figure 5:
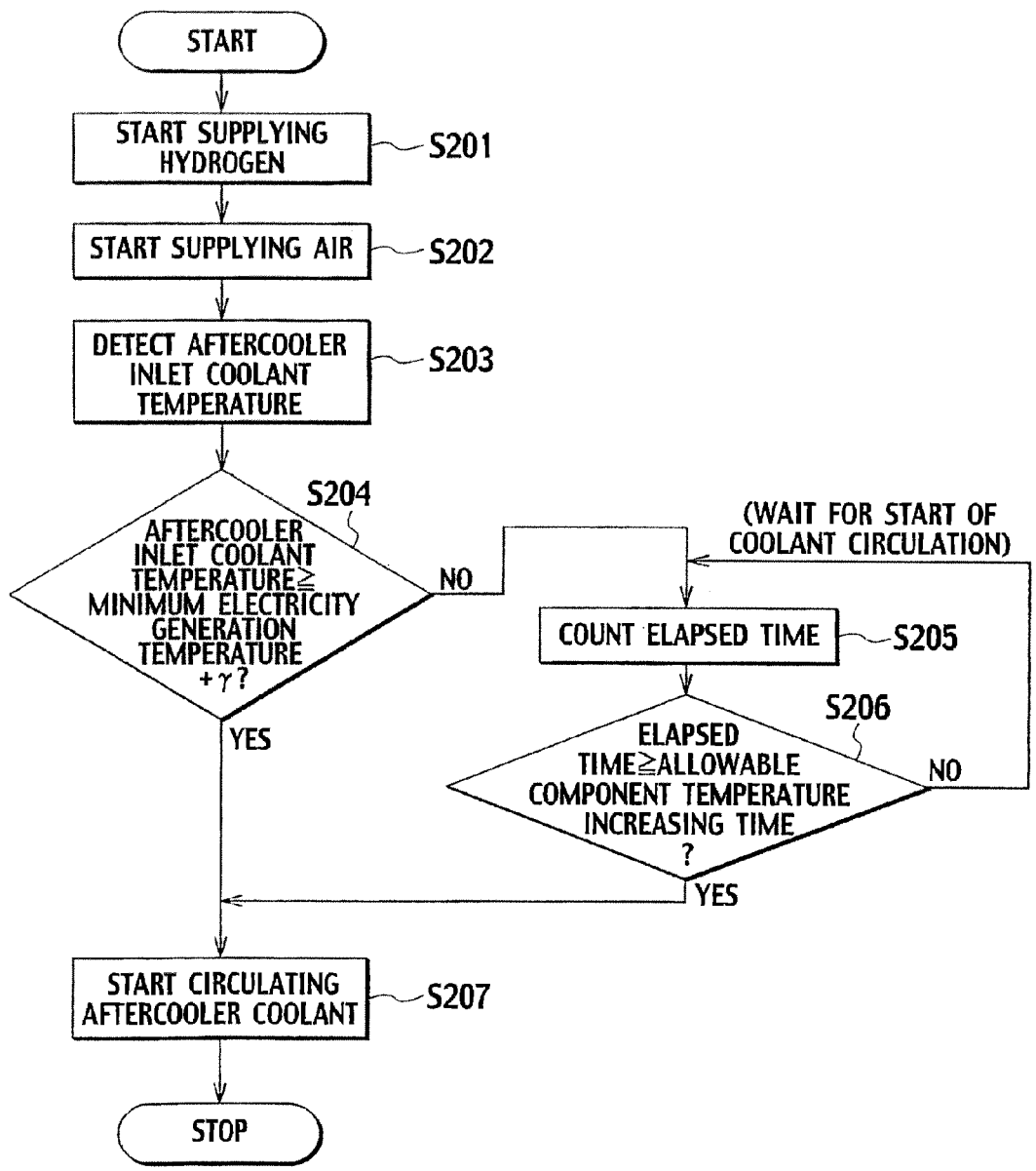
FIG. 5 is a flowchart explaining a processing flow of cold start control of a fuel cell according to the second embodiment.
Figure 6:
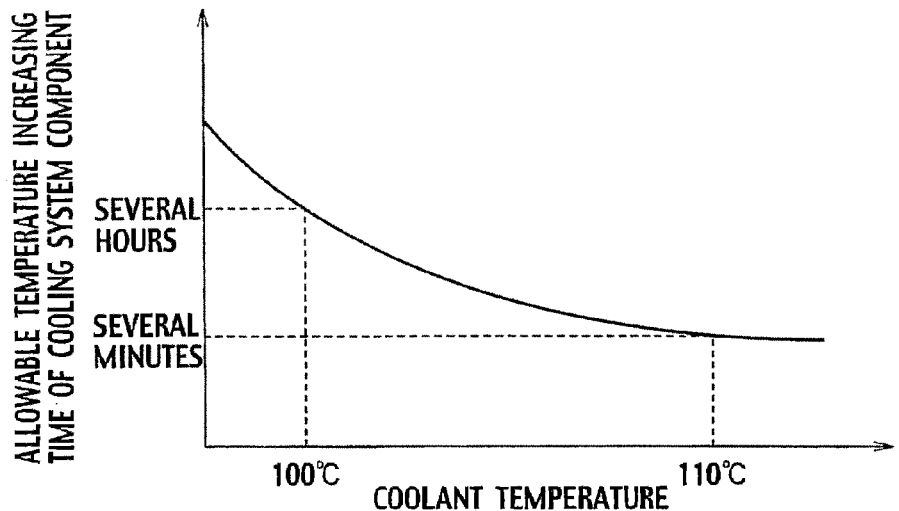
FIG. 6 is a graph showing a relationship between a time period when temperature of cooling system components can remain below an upper temperature limit and coolant temperature according to the second embodiment.
Figure 7:
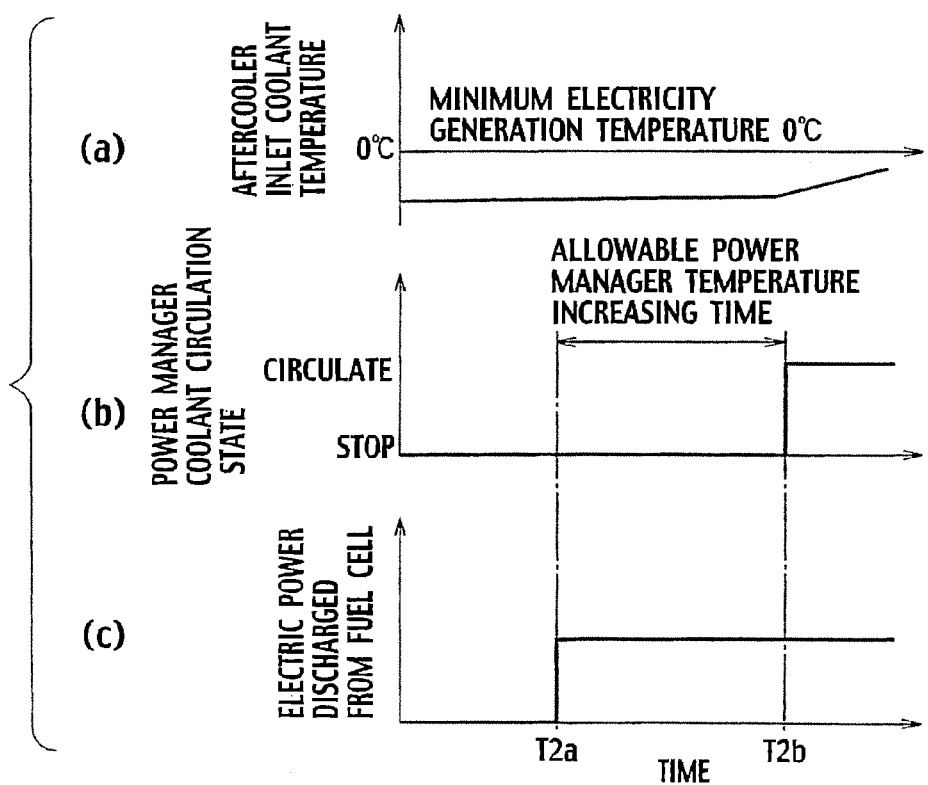
FIG. 7 is a time chart explaining an operation in the cold start control of a fuel cell according to the second embodiment.

Next, a description is given of cold start control of the fuel cell 1 in the fuel cell system according to this embodiment with reference to FIGS. 5 to 7. FIG. 5 shows a flowchart explaining a processing flow of the cold start control of the fuel cell 1 in this embodiment; FIG. 6 shows a diagram explaining the relationship between coolant temperature and a period of time when temperature of a component in the cooling systems can remain below the upper temperature limit; and FIG. 7 shows a time chart explaining an operation in the cold start control of the fuel cell 1 in this embodiment. In FIG. 7, $(a)$, $(b)$, and $(c)$ represent a change with time of the inlet coolant temperature of the aftercooler, a change with time of the state of the coolant circulation of the power manager 15, and a change with time of electric power discharged from the fuel cell 1, respectively.

Hereinafter, a description is given along the flowchart of FIG. 5. First, supply of hydrogen from the hydrogen tank 10 to the anode of the fuel cell 1 is started (step S201). The compressor 8 is then driven to start supplying air to the cathode of the fuel cell 1 (step S202).

Next, the inlet coolant temperature of the aftercooler 7 is detected by the aftercooler inlet temperature sensor 18 (step S203). It is then judged whether the detected inlet coolant temperature of the aftercooler 7 is γ or more higher than the minimum electricity generation temperature of the fuel cell 1 (step S204). When it is judged in the step S204 that the inlet coolant temperature of the aftercooler 7 is γ or more higher than the minimum electricity generation temperature of the fuel cell 1, the process proceeds to step S207, and the circulation of the aftercooler coolant is started. Herein, γ is a temperature margin.

When it is judged in the step S204 that the inlet coolant temperature of the aftercooler 7 is not γ or more higher than the minimum electricity generation temperature of the fuel cell 1, the process proceeds to step S205, and an operating time of the power manager 15, which is one of the components disposed in the cooling systems, is counted. Thereafter, it is judged whether the operating time exceeds a period of time (allowable temperature increasing time) when the temperature of the power manager 15 can remain low so as not to reach around the upper temperature limit even if the circulation of the aftercooler coolant is being stopped (step S206). When the operating time does not exceed the allowable temperature increasing time of the power manager 15, the process returns to step S205 in the step S206, and a loop of waiting for start of the circulation of the coolant by the steps S205 and S206 is continued. On the other hand, when the operating time exceeds the allowable temperature increasing time of the power manager 15, the process proceeds to the step S207, and the circulation of the aftercooler coolant is started.

Herein, the allowable temperature increasing time when the temperature of the power manager 15 can remain below around the upper temperature limit is set according to the coolant temperature based on the characteristic shown in FIG. 6. The temperature of components disposed in the cooling systems can be considered to be substantially equal to the coolant temperature until and at start-up of the fuel cell. The higher the inlet coolant temperature of the aftercooler 7, the higher the temperature of the power manager 15. Accordingly, the higher the coolant temperature, the shorter the period of time when the component temperature can remain below around the upper temperature limit. In FIG. 6, an example of the period of time when the temperature of components can remain below around the upper temperature limit is shown, but the period of time when the temperature of components can remain below respective upper temperature limits greatly varies depending on kinds of the components. Specifically, when the coolant temperature is 110°°C., some kinds of components have an allowable temperature increasing time of several seconds, and when the coolant temperature is 100°°C., some kinds of components have an allowable temperature increasing time of several minutes.

The subroutine of waiting for the fuel cell 1 to start electricity generation can be carried out in a similar way to the first embodiment (the process of the steps S107 to S109 in FIG. 2), and the detailed description thereof is omitted in this embodiment.

Next, a description is given of an operation along the time chart of FIG. 7. First, in the initial state, since the inlet coolant temperature of the aftercooler 7 is lower than the minimum electricity generation temperature, the circulation of the coolant for the power manager 15 is not started yet. The temperature of the supplied air is then increased to start electricity generation of the fuel cell 1 (time T2a). Thereafter, when the allowable temperature increasing time of the power manager 15 elapses (time T2b), the coolant for the power manager 15 starts being circulated.

In the case of a system configuration in which the coolant for the aftercooler 7 flows through the fuel cell 1, in consideration of the upper temperature limit of the fuel cell 1, the allowable temperature increasing time is set so that the temperature of the fuel cell 1 does not exceed the upper temperature limit after the fuel cell 1 starts generating electricity even if the circulation of the coolant is being stopped. In the case of a system configuration in which the coolant flows through both the power manager 15 and the fuel cell 1, the shorter one of the period of times when the temperatures of the power manager 15 and the fuel cell 1 can remain below respective upper temperature limits is employed.

As described above, the fuel cell system of this embodiment includes the fuel cell 1 supplied with hydrogen and air to generate electricity; the fuel gas supply unit supplying hydrogen to the fuel cell 1; the oxidizing gas supply unit supplying air to the fuel cell 1; the aftercooler 7 cooling air supplied to the fuel cell 1 by heat exchange with the coolant; the coolant temperature detector (aftercooler inlet temperature sensor) 18 detecting temperature of the coolant; and the coolant circulation controller 21b which sets a predetermined temperature to a temperature of not lower than the minimum temperature of the supplied air at which the fuel cell 1 can generate electricity, and stops the circulation of the coolant when the coolant temperature detected by the coolant temperature detector 18 at the start-up is not higher than the set predetermined value. Accordingly, while the coolant temperature is not higher than a temperature which is not less than the minimum temperature of the supplied air at which the fuel cell 1 can generate electricity, the air supplied to the fuel cell 1 is not cooled by the aftercooler 7, thus promoting electricity generation of the fuel cell 1 at cold start-up and shortening the start-up time. Moreover, it is possible to eliminate the conventional problem that when the coolant is circulated at cold start-up, the temperature of the air supplied to the fuel cell is cooled by the aftercooler and the water of the electrolyte membrane is frozen to make it difficult to generate electricity.

In the fuel cell system of this embodiment, the coolant circulation controller 21b is configured to start the circulation of the coolant after the period of time when the temperature of the components can remain below the upper temperature limit even if the coolant temperature detected by the coolant temperature detector (aftercooler inlet temperature sensor) 18 is not higher than the predetermined temperature. In other words, because if a component is operated while the circulation of the coolant is being stopped, the component generates heat, the circulation of the coolant is started after the predetermined time even if the detected coolant temperature is not higher than the predetermined temperature. In addition, the predetermined time to start the circulation of the coolant is set to the period of time when the temperature of the component can remain below the upper temperature limit, so that the component can be protected.

Especially in the case where the predetermined time is set longer for lower coolant temperature, the lower the coolant temperature, the lower the temperature of a component disposed on the flow path through which the coolant circulates, and the longer the period of time when the temperature of the component can remain below the upper temperature limit can be set to be. Moreover, when the temperature of the coolant is low, the initial temperature of the air supplied to the fuel cell 1 is also low, and it takes a long time for the temperature of the supplied air to increase. Accordingly, stopping the circulation of the coolant for a long time promotes the temperature increase of the supplied air.

Third Embodiment

Figure 8:
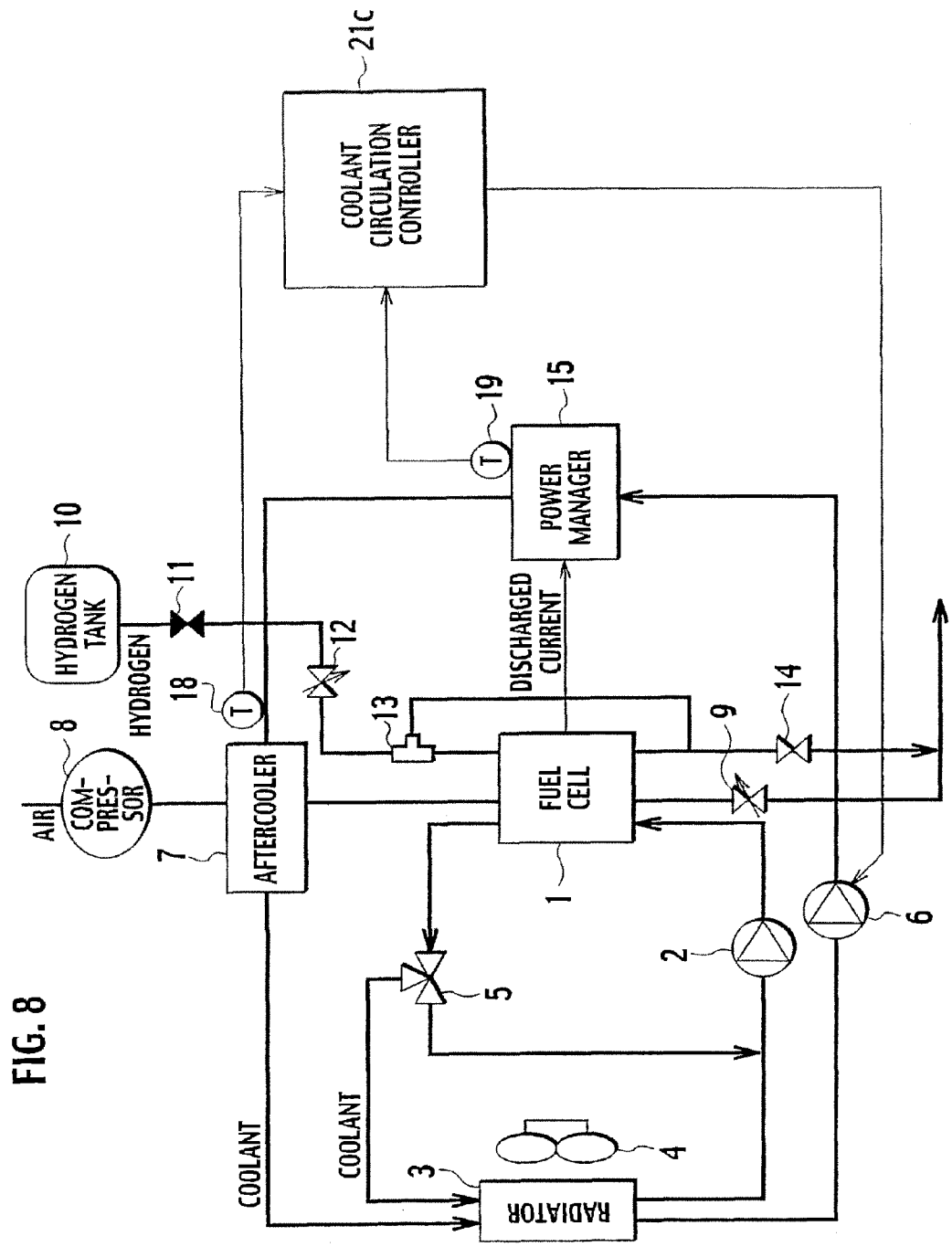
FIG. 8 is a block diagram of a fuel cell system according to a third embodiment.

Next, a description is given of a fuel cell system according to a third embodiment. FIG. 8 shows a configuration of the fuel cell system according to the third embodiment. The fuel cell system of this embodiment, similar to the first embodiment, includes the fuel cell 1 and the power manager 15. Moreover, the hydrogen supply system, the air supply system and the cooling systems for the fuel cell 1 and the power manager 15 have configurations equivalent to those of the first embodiment. The description of these components is therefore omitted. The configuration of this embodiment differs from that of the first embodiment in that the aftercooler inlet temperature sensor 18 corresponding to a coolant temperature detector, a power manager temperature sensor 19 corresponding to a component temperature detector, and a coolant circulation controller 21c are provided as the coolant circulation control system.

The aftercooler inlet temperature sensor 18 detects temperature of the coolant at the inlet of the aftercooler 7. The power manager temperature sensor 19 detects temperature of the power manager 15. The coolant circulation controller 21c determines start of the circulation of the coolant for the power manager 15 at start-up of the fuel cell 1 according to the temperature of the power manager 15 detected by the power manager temperature sensor 19 and the inlet coolant temperature of the aftercooler 7 detected by the aftercooler inlet temperature sensor 18.

Figure 9:
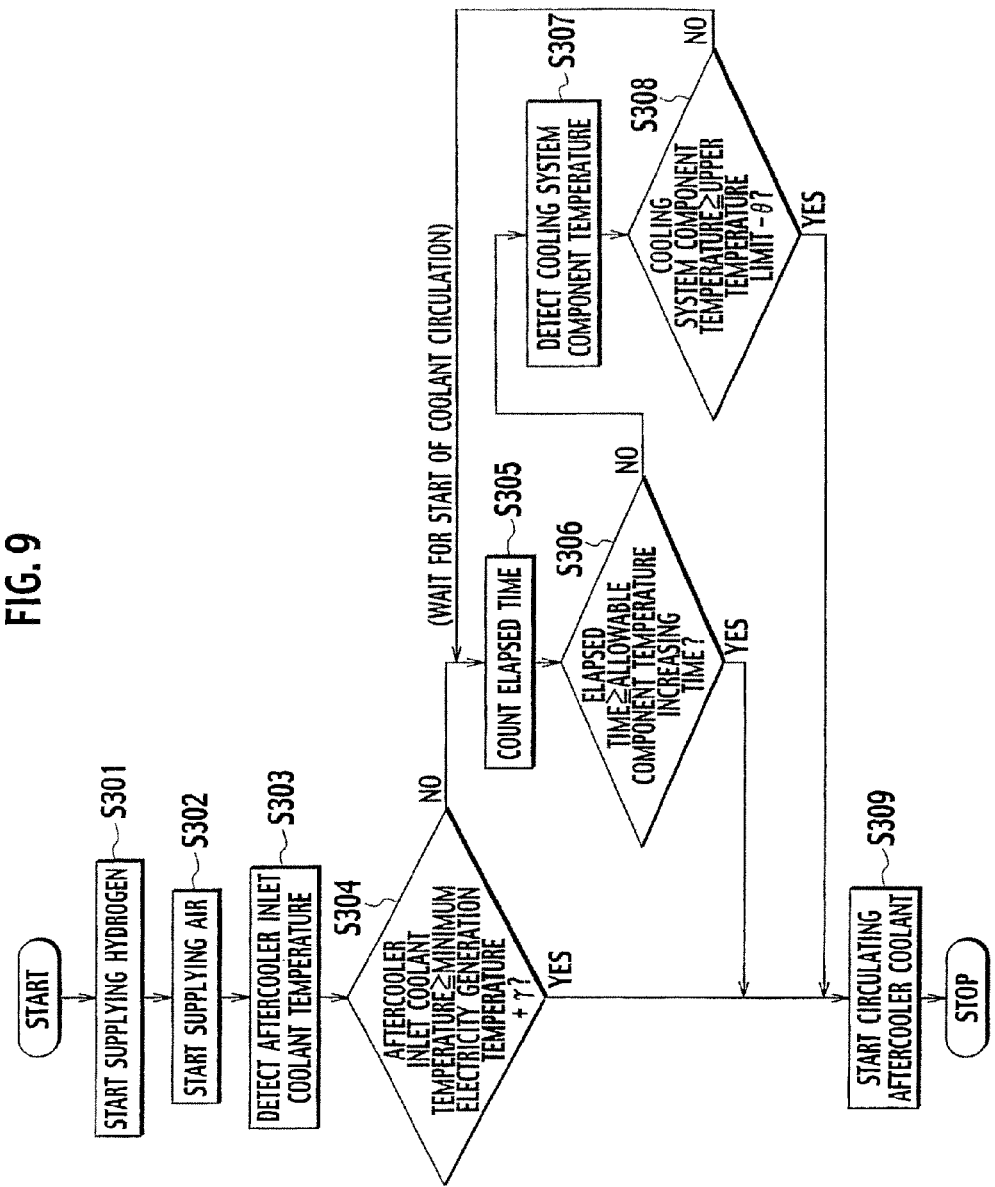
FIG. 9 is a flowchart explaining a processing flow of cold start control of a fuel cell according to the third embodiment.
Figure 10:
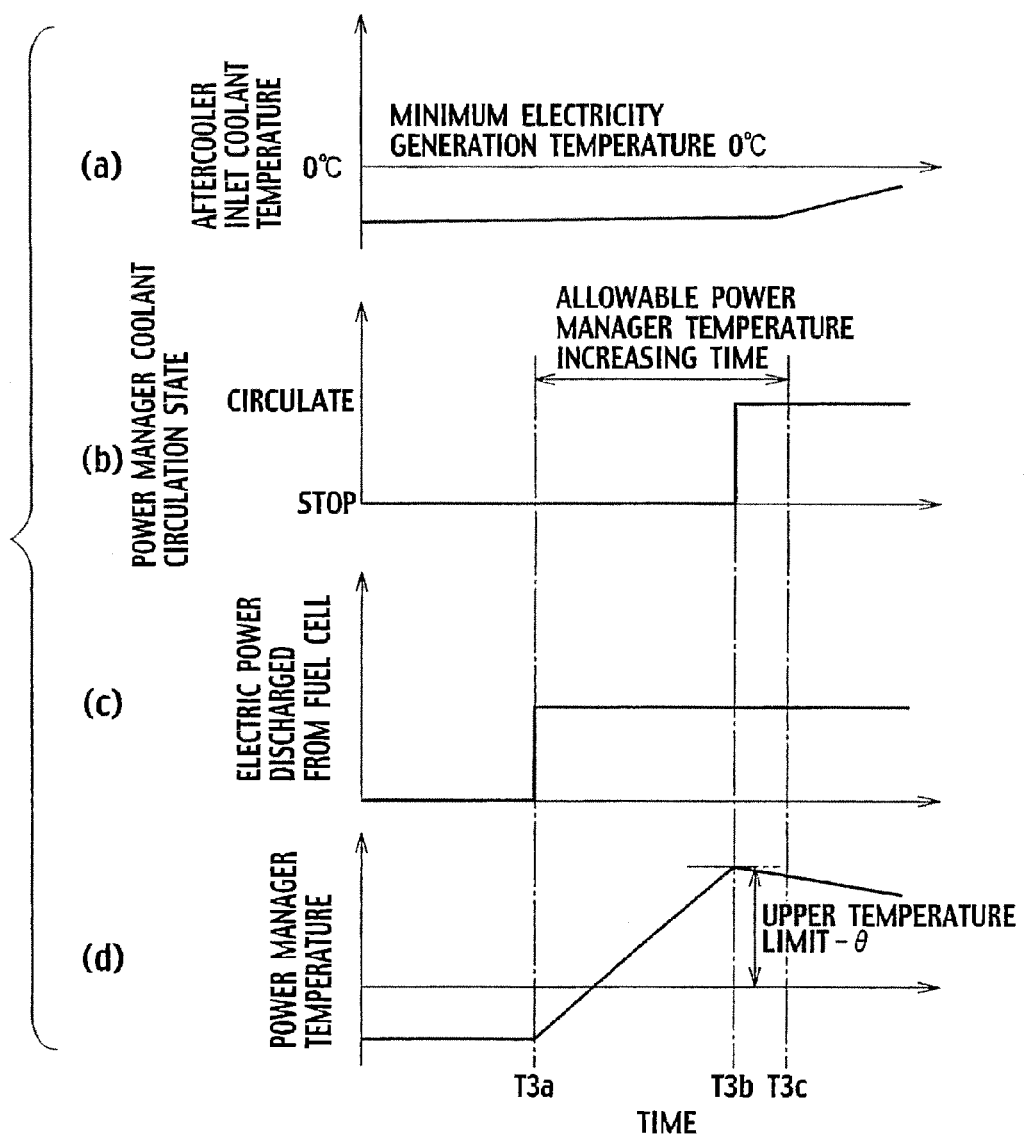
FIG. 10 is a time chart explaining an operation in the cold start control of a fuel cell according to the third embodiment.

Next, a description is given of cold start control of the fuel cell 1 in the fuel cell system according to this embodiment with reference to FIGS. 9 and 10. FIG. 9 shows a flowchart explaining a processing flow of the cold start control of the fuel cell 1 in this embodiment, and FIG. 10 shows a time chart explaining an operation in the cold start control of the fuel cell 1 in this embodiment. In FIG. 10, ($a$), ($b$), ($c$), and ($d$) represent changes with time of the inlet coolant temperature of the aftercooler, the state of the coolant circulation for the power manager 15, electric power discharged from the fuel cell 1, and the temperature of the power manager 15, respectively.

Hereinafter, a description is given along the flowchart of FIG. 9. First, supply of hydrogen from the hydrogen tank 10 to the anode of the fuel cell 1 is started (step S301). The compressor 8 is then driven to start supplying air to the cathode of the fuel cell 1 (step S302).

Next, the inlet coolant temperature of the aftercooler 7 is detected by the aftercooler inlet temperature sensor 18 (step S303). It is then judged whether the detected inlet coolant temperature of the aftercooler 7 is $\gamma$ or more higher than the minimum electricity generation temperature of the fuel cell 1 (step S304). When it is judged in the step S304 that the inlet coolant temperature of the aftercooler 7 is $\gamma$ or more higher than the minimum electricity generation temperature of the fuel cell 1, the process proceeds to step S309, and the circulation of the aftercooler coolant is started. Herein, $\gamma$ is a temperature margin.

When it is judged in the step S304 that the inlet coolant temperature of the aftercooler 7 has not reached a temperature of $\gamma$ or more higher than the minimum electricity generation temperature, the process proceeds to step S305, and an operating time of the power manager 15, which is one of the components disposed in the cooling systems, is counted. Thereafter, it is judged whether the operating time exceeds the period of time when the temperature of the power manager 15 can remain low so as not to reach around the upper temperature limit even if the circulation of the aftercooler coolant is being stopped (step S306). In the step S306, when the operating time exceeds the allowable temperature increasing time of the power manager 15, the process proceeds to step S309, and the circulation of the aftercooler coolant is started.

On the other hand, when the operating time does not exceed the allowable temperature increasing time of the power manager 15, the process proceeds to step S307, and the temperature of a component disposed in the cooling systems, that is, the power manager 15, is detected by the power manager temperature sensor 19. It is then judged whether the detected temperature of the power manager 15 has reached a temperature value or higher which is $\theta$ lower than the upper temperature limit of the power manger 15 (step S308). In the step S308, when the temperature of the power manager 15 has reached the temperature value or higher which is $\theta$ lower than the upper temperature limit of the power manger 15, the process proceeds to the step S309, and the circulation of the aftercooler coolant is started. On the other hand, when the temperature of the power manager 15 has not reached the temperature value or higher which is θ lower than the upper temperature limit of the power manger 15, the process returns to the step S305, and a loop of waiting for start of the circulation of the coolant by the steps S305 to S308 is continued. Herein, θ is a temperature margin.

Next, a description is given of an operation along the time chart of FIG. 10. First, in the initial state, since the inlet coolant temperature of the aftercooler 7 is lower than the minimum electricity generation temperature, the circulation of the coolant of the power manager 15 is not started yet. The temperature of the supplied air is then increased to start electricity generation of the fuel cell 1 (time T3a). Thereafter, the temperature of the power manager 15 reaches the temperature which is θ, as a margin, lower than the upper temperature limit (time T3b) before the allowable temperature increasing time of the component (power manager 15) elapses (time T3c). The coolant of the power manager 15 starts being circulated at that time (time T3b).

As described above, in the fuel cell system of this embodiment, the temperature of a component disposed on the flow path through which the coolant circulates is detected by the component temperature detector (power manger temperature detection sensor) 19, and the circulation of the coolant is started by the coolant circulation controller 21c when the temperature of the component exceeds the predetermined temperature which is not higher than the upper temperature limit thereof. The component can be therefore protected from heat.

Moreover, the flow rate of the coolant circulated by the coolant circulation controller 21c is set to such a flow rate that the temperature of the air supplied to the fuel cell 1 is maintained at the minimum electricity generation temperature or higher. This can prevent the temperature of the supplied air from falling to a temperature at which electricity cannot be generated, and the electricity generation can be maintained.

Furthermore, even when the temperature of air supplied to the fuel cell 1 is lower than the minimum electricity generation temperature, the coolant circulation controller 21c circulates the coolant when the temperature of the component disposed in the air supply system or the cooling systems exceeds the predetermined temperature which is not higher than the upper temperature limit thereof and sets the flow rate of the coolant to such a flow rate that the temperature of the component does not exceed the upper temperature limit and the temperature of the supplied air does not fall significantly. It is therefore possible to place priority on protection of the component rather than on electricity generation and protect the component from heat.

The aforementioned component temperature detector (power manager temperature sensor) 19 may be used in the fuel cell system of the first embodiment. Specifically, it is possible to provide the power manager temperature sensor 19 for the power manger 15 in the fuel cell system of the first embodiment and make a control similar to that of the third embodiment. The power manger 15 can be therefore protected from heat.

Fourth Embodiment

Figure 11:
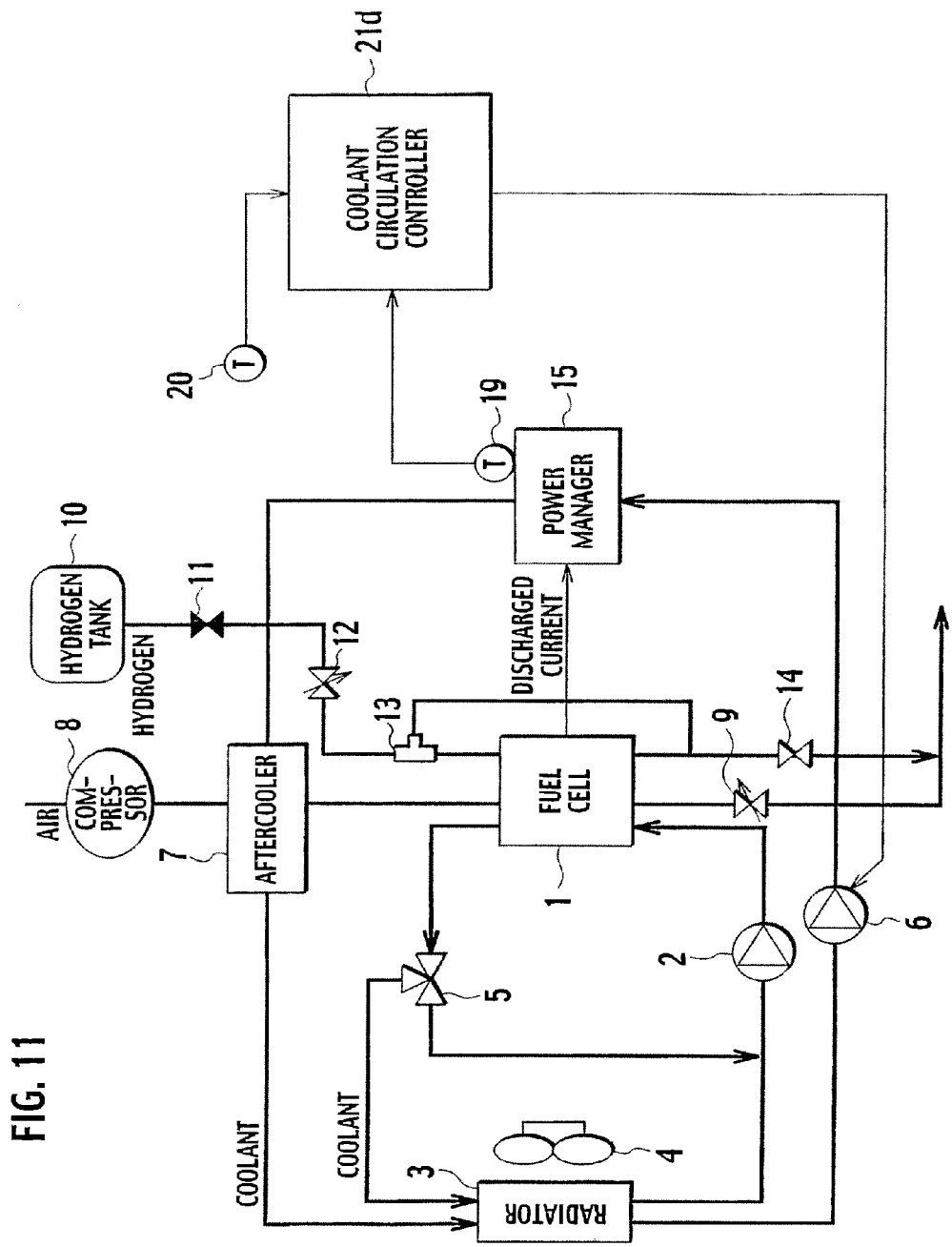
FIG. 11 is a block diagram of a fuel cell system according to a fourth embodiment.

Next, a description is given of a fuel cell system according to a fourth embodiment. FIG. 11 shows a configuration of the fuel cell system according to the fourth embodiment. The fuel cell system of this embodiment, similar to the first embodiment, includes the fuel cell 1 and the power manager 15. Moreover, the hydrogen supply system, the air supply system, and the cooling systems for the fuel cell 1 and the power manager 15 have configurations equivalent to those of the first embodiment. The description of these components is therefore omitted. The configuration of this embodiment differs from that of the first embodiment in that the power manager temperature sensor 19 corresponding to the component temperature detector, an outside air temperature sensor 20 corresponding to an outside air temperature detector, and the coolant circulation controller 21d are provided as the coolant circulation control system.

The power manager temperature sensor 19 detects the temperature of the power manager 15. The outside air temperature sensor 20 detects outside air temperature. The coolant circulation controller 21d determines start of the circulation of the coolant for the power manager 15 at start-up of the fuel cell 1 according to the temperature of the power manager 15 detected by the power manager temperature sensor 19 and the outside air temperature detected by the outside air temperature sensor 20.

Figure 12:
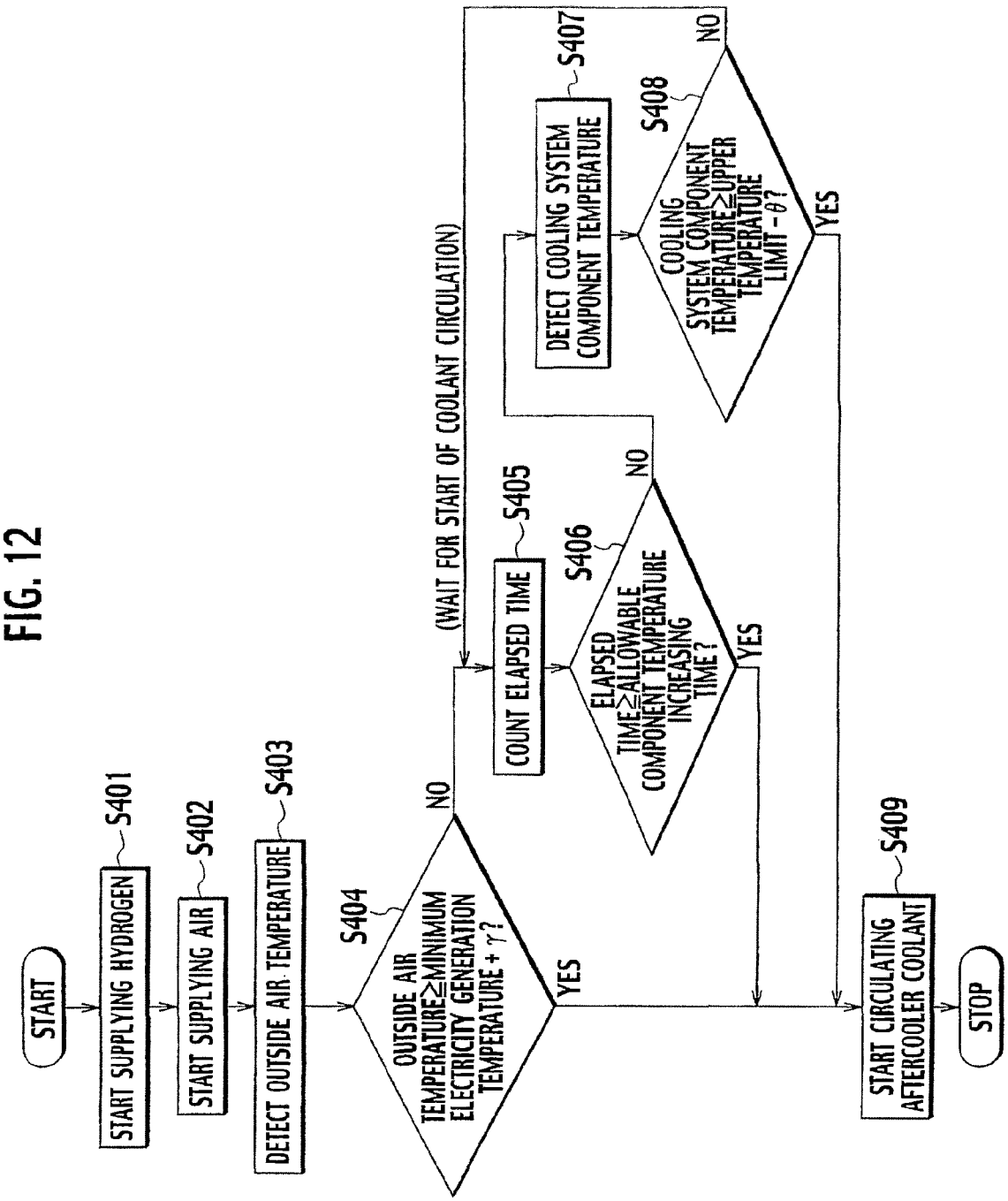
FIG. 12 is a flowchart explaining a processing flow of cold start control of a fuel cell according to the fourth embodiment.

Next, a description is given of cold start control of the fuel cell 1 in the fuel cell system according to this embodiment with reference to FIG. 12. FIG. 12 shows a flowchart explaining a processing flow of the cold start control of the fuel cell 1 in this embodiment.

Hereinafter, a description is given along the flowchart of FIG. 12. First, supply of hydrogen from the hydrogen tank 10 to the anode of the fuel cell 1 is started (step S401). The compressor 8 is then driven to start supplying air to the cathode of the fuel cell 1 (step S402).

Next, the outside air temperature is detected by the outside air temperature sensor 20 (step S403). It is then judged whether the detected outside air temperature is γ or more higher than the minimum electricity generation temperature of the fuel cell 1 (step S404). When it is judged in the step S404 that the outside air temperature is γ or more higher than the minimum electricity generation temperature of the fuel cell 1, the process proceeds to step S409, and the circulation of the aftercooler coolant is started. Herein, γ is a temperature margin.

When it is judged in the step S404 that the outside air temperature has not reached a temperature of γ or more higher than the minimum electricity generation temperature of the fuel cell 1, the process proceeds to step S405, and the operating time of the power manager 15, which is one of the components disposed in the cooling systems, is counted. Thereafter, it is judged whether the operating time exceeds the period of time when the temperature of the power manager 15 can remain low so as not to reach around the upper temperature limit even if the circulation of the aftercooler coolant is being stopped (step S406). When the operating time exceeds the allowable temperature increasing time of the power manager 15 in the step S406, the process proceeds to step S409, and the circulation of the aftercooler coolant is started.

On the other hand, when the operating time does not exceed the allowable temperature increasing time of the power manager 15, the process proceeds to step S407, and the temperature of a component disposed in the cooling systems, that is, the power manager 15, is detected by the power manager temperature sensor 19. It is then judged whether the detected temperature of the power manager 15 has reached the temperature value or higher which is θ lower than the upper temperature limit of the power manger 15 (step S408). When the temperature of the power manager 15 has reached the temperature value or higher which is θ lower than the upper temperature limit of the power manger 15 in the step S408, the process proceeds to the step S409, and the circulation of the coolant is started. On the other hand, when the temperature of the power manager 15 has not reached the temperature value or higher which is θ lower than the upper temperature limit of the power manger 15, the process returns to the step S405, and a loop of waiting for start of the circulation of the aftercooler coolant by the process of the steps S405 to S408 is continued. Herein, θ is a temperature margin.

The period of time when the supply of the coolant to the power manager 15 is allowed to stop is set based on the characteristic similar to that shown in FIG. 6 using the outside air temperature instead of the coolant temperature in the second embodiment.

As described above, in the fuel cell system of this embodiment, the outside air temperature is measured by the outside air temperature detector (outside air temperature sensor) 20, and the coolant temperature detected by the coolant temperature detector (aftercooler inlet temperature sensor) 18 in the second or third embodiment is replaced with the outside air temperature measured by the outside air temperature detector (outside air temperature sensor) 20. This allows the fuel cell system of this embodiment to have an effect similar to that of the fuel cell system of the second or third embodiment.

Fifth Embodiment

Figure 13:
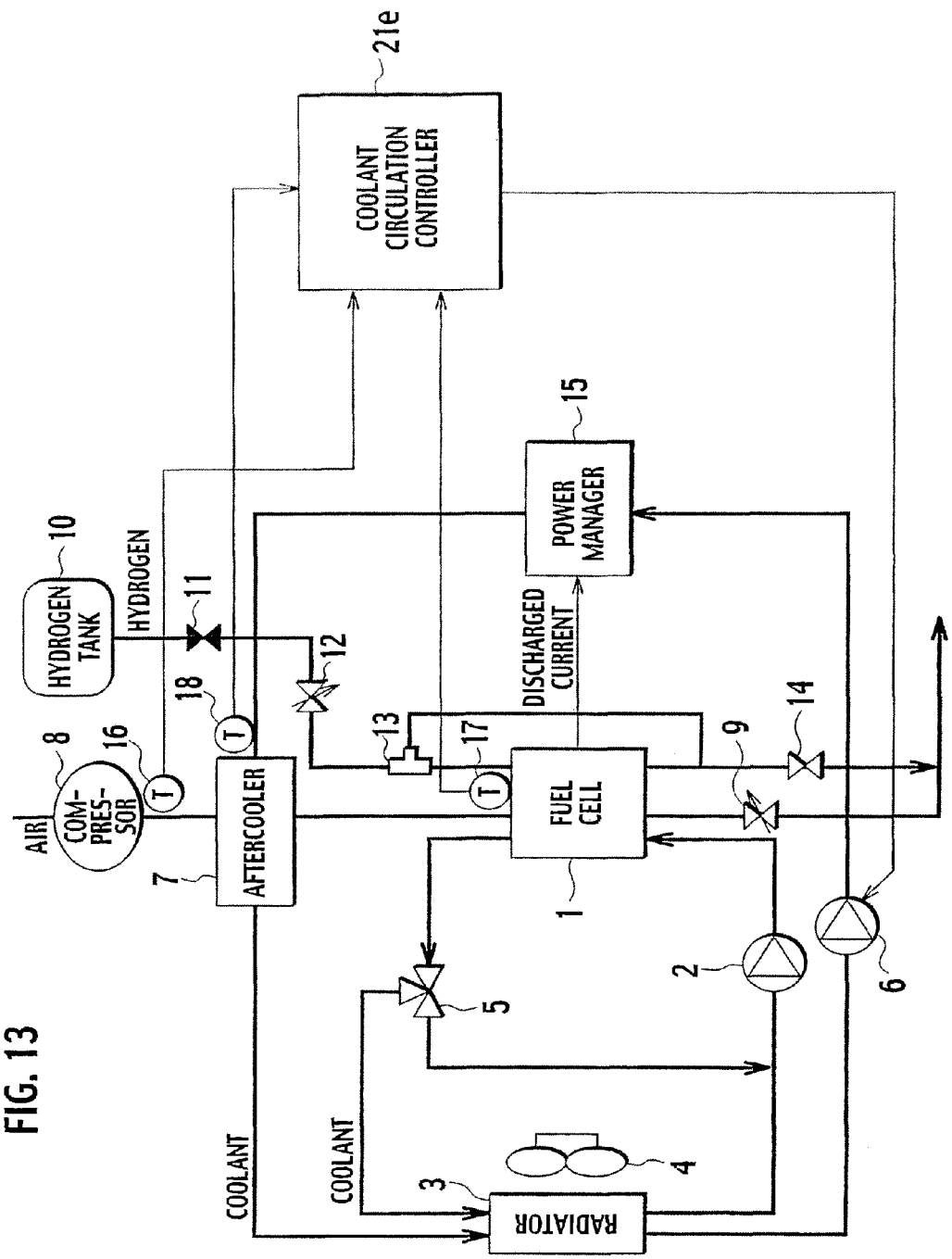
FIG. 13 is a block diagram of a fuel cell system according to a fifth embodiment.

Next, a description is given of a fuel cell system according to the fifth embodiment. FIG. 13 shows a configuration of the fuel cell system according to a fifth embodiment. The fuel cell system of this embodiment, similar to the first embodiment, includes the fuel cell 1 and the power manager 15. Moreover, the hydrogen supply system, the air supply system, and the cooling systems for the fuel cell 1 and the power manager 15 have configurations equivalent to those of the first embodiment. The description of these components is therefore omitted. This embodiment has a configuration composed of a combination of the first and second embodiments and includes, as the coolant circulation control system, the compressor outlet temperature sensor 16 and fuel cell inlet temperature sensor 17 corresponding to the oxidizing gas temperature detectors, the aftercooler inlet temperature sensor 18 corresponding to the coolant temperature detector, and a coolant circulation controller 21*e*.

The coolant circulation controller 21*e* determines start of the circulation of the coolant for the power manager 15 at start up of the fuel cell 1 according to the outlet air temperature of the compressor 8 detected by the compressor outlet temperature sensor 16, the inlet air temperature of the fuel cell 1 detected by the fuel cell inlet temperature sensor 17, and the inlet coolant temperature of the aftercooler 7 detected by the aftercooler inlet temperature sensor 18.

Figure 14:
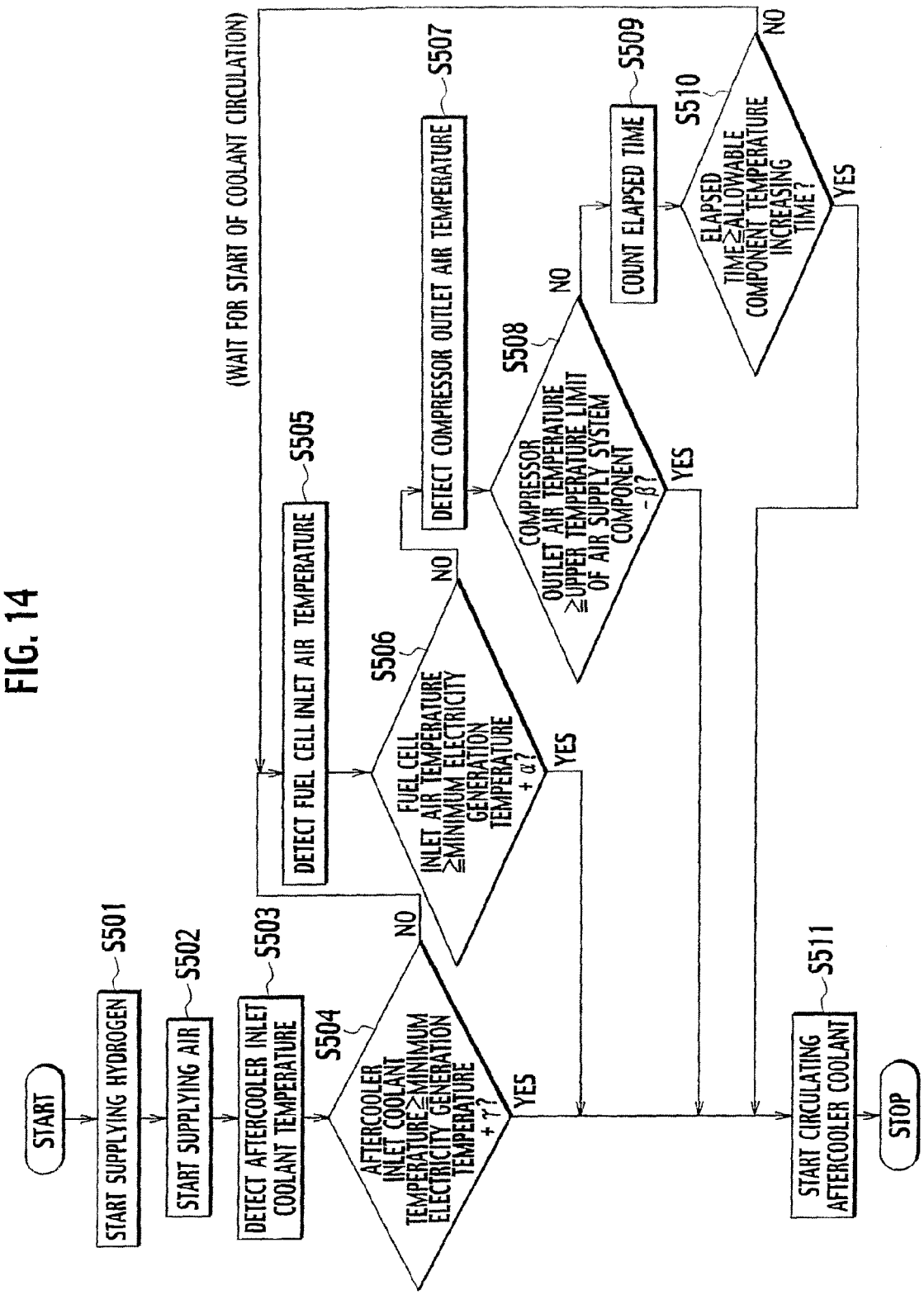
FIG. 14 is a flowchart explaining a processing flow of cold start control of a fuel cell according to the fifth embodiment.

Next, a description is given of cold start control of the fuel cell 1 in the fuel cell system according to this embodiment with reference to FIG. 14. FIG. 14 shows a flowchart explaining a processing flow of the cold start control of the fuel cell 1 in this embodiment.

First, supply of hydrogen from the hydrogen tank 10 to the anode of the fuel cell 1 is started (step S501). The compressor 8 is then driven to start supplying air to the cathode of the fuel cell 1 (step S502).

Next, the inlet coolant temperature of the aftercooler 7 is detected by the aftercooler inlet temperature sensor 18 (step S503). It is then judged whether the detected inlet coolant temperature of the aftercooler 7 is γ or more higher than the minimum electricity generation temperature of the fuel cell 1 (step S504). When the inlet coolant temperature of the aftercooler 7 is γ or more higher than the minimum electricity generation temperature in the step S504, the process proceeds to step S511, and the circulation of the aftercooler coolant is started.

On the other hand, when it is judged in the step S504 that the coolant temperature has not reached the temperature of γ or more higher than the minimum electricity generation temperature, the process proceeds to step S505, and the inlet air temperature of the fuel cell 1 is detected by the fuel cell inlet temperature sensor 17. It is then judged whether the detected air temperature is α or more higher than the minimum electricity generation temperature of the fuel cell 1 (step S506). When it is judged in the step S506 that the air temperature is α or more higher than the minimum electricity generation temperature, the process proceeds to step S511, and the circulation of the aftercooler coolant is started.

On the other hand, when it is judged that the air temperature has not reached the temperature of α or more higher than the minimum electricity generation temperature, the process proceeds to the step S507, and the outlet air temperature of the compressor 8 is detected by the compressor outlet temperature sensor 16. It is then judged whether the detected outlet air temperature of the compressor 8 is not lower than the temperature value which is β lower than the upper temperature limit of the components in the air supply system (step S508). When it is judged in the step S508 that the outlet air temperature of the compressor 8 is not lower than the temperature value which is β lower than the upper temperature limit of the components in the air supply system, the process proceeds to step S511, and the circulation of the aftercooler coolant is started.

On the other hand, when it is judged that the outlet air temperature of the compressor 8 is lower than the temperature value which is β lower than the upper temperature limit, the process proceeds to the step S509, and the operating time of the power manager 15, which is one of the components disposed in the cooling systems, is counted. Thereafter, it is judged whether the operating time exceeds the period of time when the temperature of the power manager 15 can remain low so as not to reach around the upper temperature limit even if the circulation of the aftercooler coolant is being stopped (step S510). When the operating time does not exceed the allowable temperature increasing time of the power manager 15 in the step S510, the process returns to the step S505, and a loop of waiting for start of the circulation of the coolant by the process of the steps S505 to S510 is continued. On the other hand, when the operating time exceeds the allowable temperature increasing time of the power manager 15, the process proceeds to step S511, and the circulation of the aftercooler coolant is started.

Even if the temperature of the air supplied to the fuel cell 1 has not increased to the minimum electricity generation temperature, the coolant is circulated when the temperature of a component disposed in the air supply system or cooling systems exceeds the predetermined temperature which is not higher than the upper temperature limit, placing priority on component protection rather than electricity generation.

As described above, the fuel cell system of this embodiment has a configuration composed of a combination of the first and second embodiments and can have both effects of the fuel cell systems of the first and second embodiments.

The entire content of a Japanese Patent Application No. P2004-354304 with a filing date of Dec. 7, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

INDUSTRIAL APPLICABILITY

The fuel cell system according to the present invention is a fuel cell system which includes an aftercooler cooling an oxidizing gas supplied to the fuel cell by heat exchange with a coolant, in which when the temperature of the oxidizing gas supplied to the fuel cell exceeds a predetermined value, the circulation of the coolant is started. The predetermined value is set to a value of not higher than a minimum electricity generation temperature of the fuel cell, and a circulation timing and flow rate of the coolant for the aftercooler are controlled such that the supplied oxidizing gas does not become cold. This enables the fuel cell to generate electricity at cold start-up.

The invention claimed is:

1. A fuel cell system, comprising:
   a fuel cell configured to be supplied with fuel gas and oxidizing gas to generate electricity, the fuel cell comprising an electrolyte membrane configured to contain water formed by reacting the fuel gas with the oxidizing gas;
   a fuel gas supply unit configured to supply the fuel gas to the fuel cell;
   an oxidizing gas supply unit configured to supply the oxidizing gas to the fuel cell;
   a component temperature detector configured to detect a temperature of a cooling system component disposed on a flow path through which a coolant circulates and reduces a temperature of the oxidizing gas and,
   wherein a coolant circulation controller is configured to start circulation of the coolant when the component temperature exceeds a predetermined temperature not higher than an upper temperature limit of the cooling system component.

2. A fuel cell system, according to claim 1, further comprising:
   an oxidizing gas temperature detector configured to detect a temperature of the oxidizing gas to be supplied to the fuel cell;
   a coolant circulation controller configured to start circulation of the coolant when the detected temperature of the oxidizing gas detected by the oxidizing gas temperature detector exceeds a predetermined temperature value, wherein the predetermined temperature value is not lower than a freezing point of the water.

3. A fuel cell system according to claim 2,
   wherein the oxidizing gas temperature detector is configured to detect a temperature of the oxidizing gas at an inlet of the fuel cell.

4. A fuel cell system according to claim 2,
   wherein the predetermined temperature value is a value not higher than an upper temperature limit of an air supply system component disposed on a flow path of the oxidizing gas.

5. A fuel cell system according to claim 4,
   wherein the oxidizing gas temperature detector is configured to detect a temperature of the oxidizing gas at an outlet of the oxidizing gas supply unit.

6. A fuel cell system, according to claim 1, further comprising:
   an aftercooler configured to reduce the temperature of the oxidizing gas to be supplied to the fuel cell by heat exchange with the coolant;
   a power manager configured to take out and manage electric power generated by the fuel cell, and
   wherein the aftercooler and the power manager are disposed on a flow path through which the coolant circulates, and are cooled by the same coolant.

7. A fuel cell system, according to claim 6, wherein the aftercooler is configured to cool the oxidizing gas before the oxidizing gas enters the fuel cell.

8. A fuel cell system, comprising:
   a fuel cell configured to be supplied with fuel gas and oxidizing gas to generate electricity, the fuel cell comprising an electrolyte membrane configured to contain water formed by reacting the fuel gas with the oxidizing gas;
   a fuel gas supply unit configured to supply the fuel gas to the fuel cell;
   an oxidizing gas supply unit configured to supply the oxidizing gas to the fuel cell;
   an aftercooler configured to reduce a temperature of the oxidizing gas to be supplied to the fuel cell by heat exchange with a coolant;
   an oxidizing gas temperature detector configured to detect a temperature of the oxidizing gas to be supplied to the fuel cell; and
   a coolant circulation controller configured to start circulation of the coolant when the detected temperature of the oxidizing gas detected by the oxidizing gas temperature detector exceeds a predetermined temperature value, wherein the predetermined temperature value is not lower than a freezing point of the water,
   wherein a flow rate of the coolant circulated by the coolant circulation controller is set to a flow rate at which the oxidizing gas temperature can be maintained at a temperature not lower than a minimum temperature at which the fuel cell can generate electricity.

9. A fuel cell system according to claim 8,
   wherein the oxidizing gas temperature detector is configured to detect a temperature of the oxidizing gas at an inlet of the fuel cell.

10. A fuel cell system according to claim 8,
    wherein the predetermined temperature value is a value not higher than an upper temperature limit of an air supply system component disposed on a flow path of the oxidizing gas.

11. A fuel cell system according to claim 10,
    wherein the oxidizing gas temperature detector is configured to detect a temperature of the oxidizing gas at an outlet of the oxidizing gas supply unit.

12. A fuel cell system, according to claim 8, further comprising:
    a power manager configured to take out and manage electric power generated by the fuel cell,
    wherein the aftercooler and the power manager are disposed on a flow path through which the coolant circulates, and are cooled by the same coolant.

13. A fuel cell system, according to claim 8, wherein the aftercooler is configured to cool the oxidizing gas before the oxidizing gas enters the fuel cell.

* * * * *